United States Patent [19]

Boardman

[11] Patent Number: 5,109,729
[45] Date of Patent: May 5, 1992

[54] THROTTLE CONTROL FAULT DETECTION AND TOLERANCE METHOD/SYSTEM

[75] Inventor: Mark D. Boardman, Portage, Mich.

[73] Assignee: Eaton Corporation, Cleveland, Ohio

[21] Appl. No.: 697,813

[22] Filed: May 9, 1991

[51] Int. Cl.$^5$ ............................................... F16H 61/00
[52] U.S. Cl. ......................................... 74/858; 74/857
[58] Field of Search ................................. 74/857, 858

[56] References Cited

U.S. PATENT DOCUMENTS

| | | | |
|---|---|---|---|
| 4,361,060 | 11/1982 | Smyth | 74/866 |
| 4,403,527 | 9/1983 | Mohh et al. | 74/858 X |
| 4,527,447 | 7/1985 | Richards | 74/866 |
| 4,595,986 | 6/1986 | Daubenspeck et al. | 364/424.1 |
| 4,614,126 | 9/1986 | Edelen et al. | 74/333 |
| 4,784,019 | 11/1988 | Morscheck | 74/720 |
| 4,860,861 | 8/1989 | Gooch et al. | 192/3.26 |
| 4,899,607 | 2/1990 | Stainton | 74/335 |
| 5,038,287 | 8/1991 | Taniguchi et al. | 74/858 X |

OTHER PUBLICATIONS

SAE Paper No. 881830 presented Nov. 1988.
SAE Standard J1922.

*Primary Examiner*—Dirk Wright

[57] ABSTRACT

A fault sensing and tolerant logic (FIG. 6) is provided for a control system/method for an automated mechanical transmission system (12) including a throttle dip override device (34).

25 Claims, 5 Drawing Sheets

THROTTLE CONTROL FAULT DETECTION AND TOLERANCE METHOD/SYSTEM

BACKGROUND OF THE INVENTION

1. Related Applications

This application is related to co-pending U.S. patent applications:

Ser. No. 07/698,751 entitled COMPOUND POWER DOWNSHIFT METHOD/SYSTEM;

Ser. No. 07/698,745 entitled RANGE SHIFTING ONLY FAULT TOLERANCE METHOD/SYSTEM;

Ser. No. 07/697,384 entitled TOOTH BUTT/BUZZ CONTROL METHOD/SYSTEM;,

Ser. No. 07/698,752 entitled SMOOTH UPSHIFT CONTROL METHOD/SYSTEM;

Ser. No. 07/698,017 entitled DRIVELINE TORQUE LIMIT CONTROL STRATEGY-USING SAE J1922 TYPE ENGINE CONTROL;

Ser. No. 07/697,814 entitled TORQUE CONVERTER SLIP RATE BASED SKIP POWER DOWNSHIFT CONTROL STRATEGY, all filed the same day, May 9, 1991, and assigned to the same assignee, Eaton Corporation, as this application.

2. Field of the Invention

The present invention relates to a control system and control method for controlling the operation of an automated mechanical transmission system, preferably of the type including a fuel throttle device controlled engine, a torque converter, a lock-up/disconnect clutch assembly and a mechanical transmission.

In particular, the present invention relates to a fault tolerance control system/method for an automated transmission system as described above wherein the fuel throttling device is a throttle dip override device effective to reduce or shut off fuel to the engine to a predetermined relatively low value (at or below idle fuel) regardless of the operators setting of the accelerator pedal and, more particularly, relates to a fault sensing and tolerance control system/method for such an automated transmission system.

3. Description of the Prior Art

Mechanical transmission systems of the compound range, splitter or combined range and splitter type are well known in the prior art as may be seen by reference to U.S. Pat. Nos. 4,788,889; 4,754,665 and 4,735,109, the disclosures of which are incorporated by reference.

Automatic mechanical transmission systems comprising mechanical transmissions and controls and actuators to at least partially automatically shift same, usually electronically controlled in accordance with sensed inputs and predetermined logic rules, are known. Examples of such systems may be seen by reference to U.S. Pat. Nos. 4,648,290; 4,595,986; 4,527,447; 4,361,060; 4,140,031 and 4,081,065, the disclosures of which hereby incorporated by reference. Such systems may also be seen by reference to SAE Paper No. 831776 titled "AUTOMATED MECHANICAL TRANSMISSION CONTROLS", the disclosure of which is hereby incorporated by reference.

Fault tolerance logic routines for automatic transmissions are known as may be seen by reference to U S. Pat. Nos. 4,922,425; 4,849,899 and 4,899,279, the disclosures of which are hereby incorporated by reference.

Automatic transmission systems including a torque converter drivingly interposed a drive engine and a mechanical change gear transmission and/or including torque converter bypass or lock-up devices are also known as may be seen by reference to U.S. Pat. Nos. 3,593,596; 4,261,216; 4,271,724; 4,351,205 and 4,375,171, the disclosures of which are hereby incorporated by reference.

Automatic mechanical transmission systems utilizing power synchronizer devices, i.e. devices independent of engine speed to provide input shaft braking and acceleration, and not manipulation of engine speed, to synchronize the transmission jaw clutch members are known in the prior art. Examples of such systems may be seen by reference to U.S. Pat. Nos. 3,478,851, 4,023,443; 4,140,031 and 4,614,126, the disclosures of which are hereby incorporated by reference.

Automatic mechanical transmission systems having a power synchronizer and also having a torque converter drivingly interposed a drive engine and the transmission input shaft, and including a torque converter lock-up/disconnect clutch assembly, are known. Examples of such systems may be seen by reference to U.S. Pat. Nos. 4,784,019 and 4,860,861 and S.A.E. Paper No. 881830 entitled "THE EATON CEEMAT (CONVERTER ENHANCED ELECTRONICALLY MANAGED AUTOMATIC TRANSMISSION)", the disclosures of which are hereby incorporated by reference.

Such transmission systems provide an automatic mechanical transmission system utilizing a mechanical change gear transmission of a structure identical or substantially identical to the structure of transmissions intended for manual usage, providing the advantages of a torque converter for vehicle start-ups and the advantages of nonslipping connection between the engine and transmission at higher vehicle speeds/gear ratios and providing relatively rapid synchronization of the transmission positive jaw clutches. By providing an automatic mechanical transmission system based upon the same, or substantially the same, mechanical change gear transmission utilized for manual transmission systems, manufacturing, inventory and maintenance cost savings are obtained. To the transmission is added, if necessary, shifting mechanisms suitable for automatic control by solenoids or the like. An example of such a shifting mechanism may be seen by reference to above-mentioned U.S. Pat. Nos. 4,361,060 and 4,899,607 and U.S. Pat. Nos. 4,873,881; 4,722,237 and 4,445,393, the disclosures of which are hereby incorporated by reference. A power synchronizer mechanism as disclosed in above-mentioned U.S. Pat. Nos. 4,614,126; 3,478,851 or 4,023,443 is also added for synchronizing the transmission positive jaw clutches.

A torque converter is drivingly interposed the drive engine and transmission. A torque converter lock-up and disconnect clutch structure is provided comprising a first and a second separate, independently operable, clutches, preferably friction clutches, for coupling the torque converter driven member or turbine to the transmission input shaft and for coupling the torque converter input or impeller (i.e. the engine output) to the transmission input shaft, respectively.

The torque converter is drivingly interconnected between the engine and transmission only when the first coupling is engaged and the second disengaged. The torque converter is locked-up, i.e. the turbine driven directly by the engine, when the second clutch is engaged. The transmission is driven directly from the engine, whenever the second clutch is engaged simultaneously with the first clutch.

When the first coupling is disengaged, regardless of the condition of the second coupling, the transmission input shaft is disconnected from the engine torque and also from the inertia of the torque converter and from the inertia of the second coupling allowing the jaw clutches to be easily disengaged, the power synchronizer mechanism to act quickly due to relatively low inertia on the input shaft and also allowing a selected gear to be pre-engaged with the vehicle at rest and in the drive condition.

With automated transmission systems of the type described, it is important to have a method or system for sensing a faulty throttle dip override device and for adapting fault tolerance operation logic if such a fault is sensed.

SUMMARY OF THE INVENTION

In accordance with the present invention, the drawbacks of the prior art are overcome or minimized by the provision, in an automated mechanical transmission system of the type described having a throttle dip override device, of a control method/system for sensing a faulty throttle dip override device and for adapting a fault tolerant mode of operation in response to sensing such a fault.

The above is accomplished, preferably in an automatic mechanical transmission system based upon a mechanical change gear transmission to which is added shifting mechanisms suitable for automatic control, preferably, a power synchronizer mechanism as disclosed in above-mentioned U.S. Pat. No. 4,614,126, preferably a torque converter drivingly interposed the drive engine and transmission and a torque converter lock-up and disconnect clutch structure comprising a first and a second separate, independently operable, clutches, preferably friction clutches, for coupling the torque converter driven member or turbine to the transmission input shaft and for coupling the torque converter input or impeller (i.e. the engine output) to the transmission input shaft, respectively, and a throttle dip override device for selectively reducing fuel to the engine to a selected relatively low value regardless of operator's setting of the throttle pedal by the provision of control logic which will sense engine speed before and after the throttle dip is actuated to determine if the throttle dip is operating, and, if a fault is sensed, which will prohibit upshifts until the operator reduces accelerator pedal setting to below a predetermined reference value.

Accordingly, it is an object of the present invention to provide a new and improved automatic mechanical transmission system.

Another object of the present invention is to provide an automated mechanical transmission system having a throttle dip override device, and preferably a power synchronizer, which includes logic for sensing and tolerating failure to actuate type faults in the throttle dip override device.

These and other objects and advantages of the present invention will become apparent from a reading of the description of the preferred embodiment taken with the drawings.

DESCRIPTION OF THE PREFERRED EMBODIMENT

Figure 1:
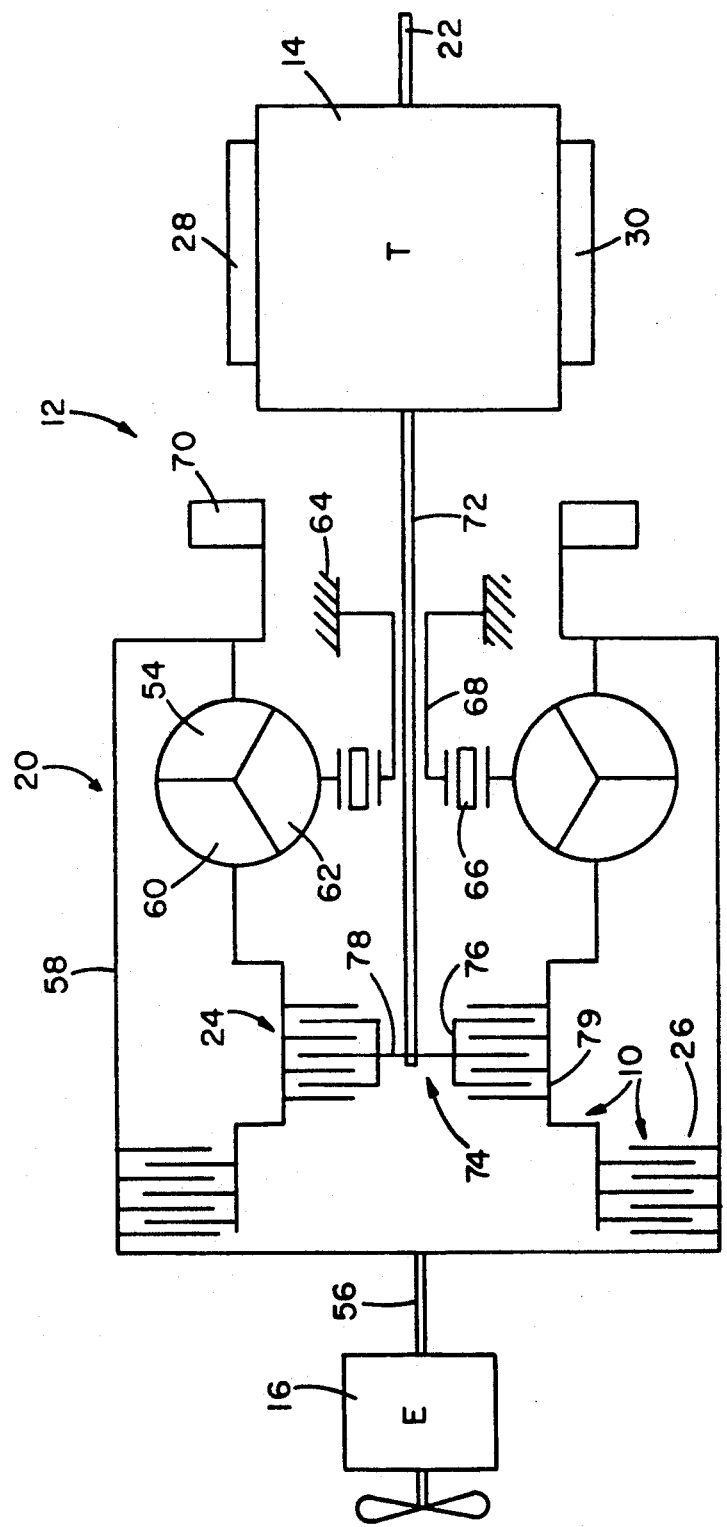
FIG. 1 is a schematic view of the torque converter and torque converter disconnect and bypass clutch structure of the present invention.

Certain terminology will be used in the following description for convenience and reference only and will not be limiting. The words "upwardly", "downwardly", "rightwardly" and "leftwardly" will designate directions in the drawings to which reference is made. The words "inwardly", and "outwardly", refer to directions towards and away from, respectively, the geometric center of the device and designated parts thereof. The above applies to the words above specifically mentioned, derivatives thereof and words of similar import.

Figure 2:
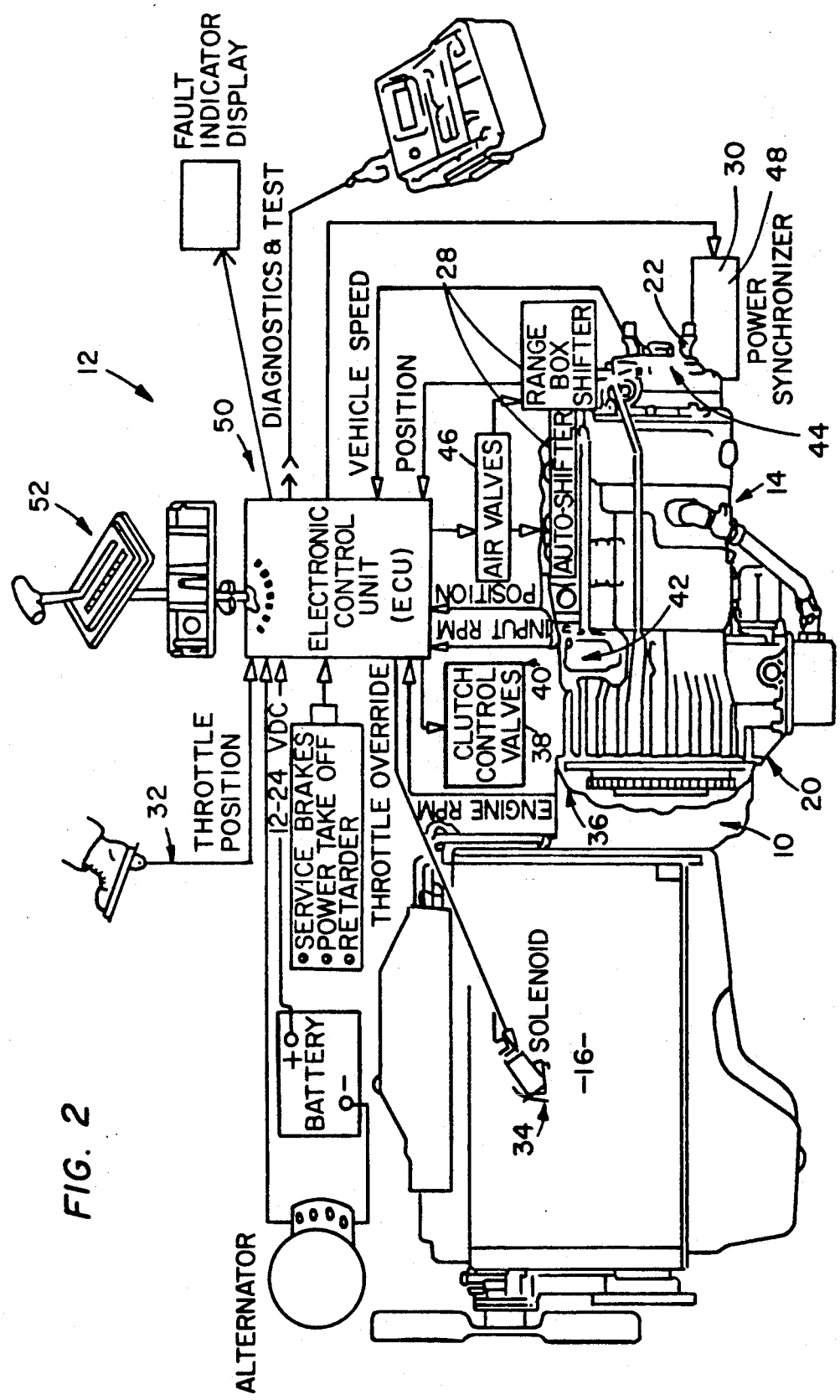
FIG. 2 is a schematic illustration of the automatic mechanical transmission system of the present invention.
Figure 3:
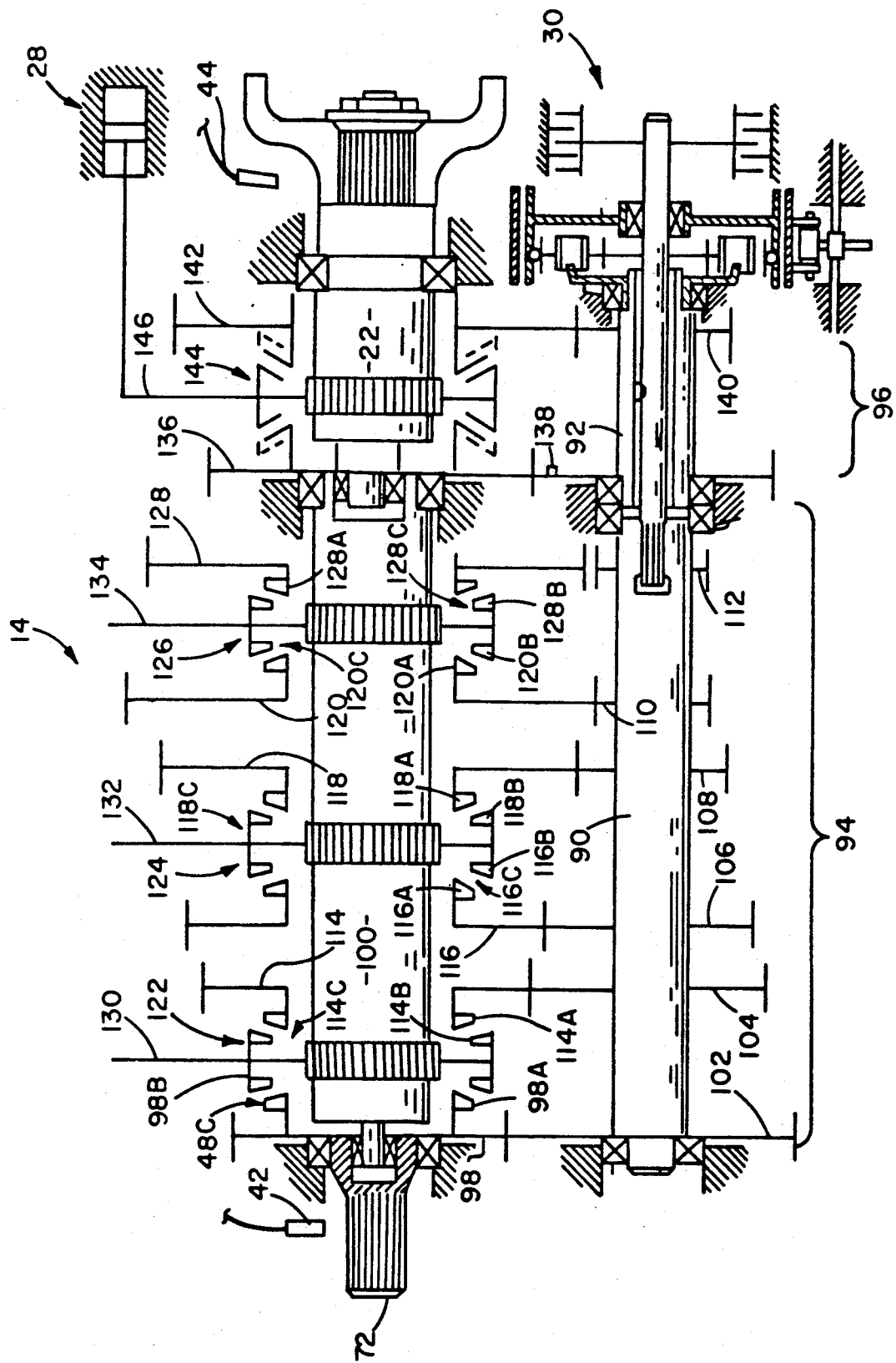
FIG. 3 is a partial view, in section, of the automatic mechanical transmission system of the present invention.

The torque converter lock-up and disconnect clutch assembly 10 and an automatic mechanical transmission system 12 utilizing same, of the present invention, are schematically illustrated in FIGS. 1, 2 and 3. The term "automatic mechanical transmission system" as used herein, shall mean a system comprising at least a throttle device controlled heat engine 16, a multi-speed jaw clutch type change gear transmission 14, a nonpositive coupling device such as a master friction clutch and/or a fluid coupling 10/20 interposed the engine and the transmission and a control unit 50 for automatically controlling same. Such systems will, of course, also include sensors and/or actuators for sending input signals to and/or receiving command output signals from the control unit.

While the present invention is particularly well suited for use in connection with transmission systems having a torque converter and torque converter lockup/disconnect clutch, the invention is also applicable to transmission systems having a standard friction master clutch drivingly interposed the engine and the transmission.

The automatic mechanical transmission system 12 of the present invention is intended for use on a land vehicle, such as a heavy duty truck, but is not limited to such use. The automatic mechanical transmission system 12 illustrated includes an automatic multi-speed mechanical change gear transmission 14 driven by a prime mover throttle device controlled engine 16 (such as a diesel engine) through a fluid coupling or torque converter assembly 20. The output of the automatic transmission 14 is an output shaft 22 which is adapted for driving connection to an appropriate vehicle component such as the differential of a drive axle, a transfer case, or the like as is well known in the prior art.

As will be discussed in greater detail below, the torque converter lock-up and disconnect clutch assembly 10 includes two separate, independently engageable clutches, preferably friction clutches, a torque converter disconnect clutch 24 and a torque converter lock-up or bypass clutch 26. The transmission 14 includes a transmission operating mechanism 28 which is preferably in the format of a pressurized fluid actuated shifting assembly of the type disclosed in above-mentioned U.S. Pat. No. 4,445,393. The transmission also preferably includes a power synchronizer assembly 30 which may be of the type illustrated and disclosed in above-mentioned U.S. Pat. Nos. 3,478,851, 4,023,443 or 4,614,126.

The present invention is also applicable to automated mechanical transmission systems not including a power synchronizer assembly.

The above-mentioned power train components are acted upon and monitored by several devices, each of which are known in the prior art and will be discussed in greater detail below. These devices may include a throttle position monitor assembly 32, which senses the position of the operator controlled vehicle throttle pedal or other fuel throttling device, a throttle control 34 which controls the supply of fuel to the engine, an engine speed sensor assembly 36 which senses the rotational speed of the engine, a torque converter disconnect clutch and lock-up clutch operator 40 which operates the torque converter disconnect and lock-up clutches, a transmission input shaft speed sensor 42, a transmission output shaft speed sensor 44, a transmission shifting mechanism operator 46 for controlling the operation of transmission shifting mechanism 28 and/or a power synchronizer mechanism actuator 48 for controlling the operation of power synchronizer mechanism 30.

The throttle control 34 may simply be an override device to reduce ("dip") fuel to the engine to a set or variable level regardless of the operator's positioning of the throttle pedal.

Typically, the override device is a solenoid controlled device which, when actuated, will reduce fuel to the engine to a relatively low value such as the amount of fuel required to retain engine speed at or below idle speed. In such systems, the engine fueling device, such as an injector rack or the like, may be directly controlled by the vehicle accelerator pedal subject to being overridden by the throttle dip override device or may be controlled by a controller receiving inputs from the accelerator pedal.

The above-mentioned devices supply information to and/or accept commands from an electronic central processing unit (ECU) 50. The central processing unit or controller 50 is preferably based on a digital microprocessor, the specific configuration and structure of which form no part of the present invention. The central processing unit 50 also receives information from a shift control or mode selector assembly 52 by which the operator may select a reverse (R), a neutral (N) or several forward drive (D, $D_L$) modes of operation of the vehicle. Typically, the D mode of operation is for on-highway vehicle travel while the $D_L$ mode of operation is for off-road operation.

Typically, the system also includes various sensors, circuits and/or logic routines for sensing and reacting to sensor and/or actuator failures.

As is known, the central processing unit 50 receives inputs from the various sensors and/or operating devices. In addition to these direct inputs, the central processing unit 50 may be provided with circuitry and/or logic for differentiating the input signals to provide calculated signals indicative of the rate of change of the various monitored devices, means to compare the input signals and/or memory means for storing certain input information, such as the direction of the last shift, and means for clearing the memory upon occurrence of predetermined events. Specific circuitry for providing the above-mentioned functions is known in the prior art and an example thereof may be seen by reference to above-mentioned U.S. Pat. Nos. 4,361,060 and 4,595,986 and/or by reference to a technical paper entitled "THE AUTOMATION OF MECHANICAL TRANSMISSIONS" published proceedings of a joint IEEE/SAE conference entitled International Congress 20 on Transportation Electronics, IEEE Catalog Number 84CH1988-5, the disclosure of which is hereby incorporated by reference.

As is well known in the operation/function of electronic control units, especially microprocessor based ECUs, the various logic functions can be performed by discrete hardwired logic units or by a single logic unit operating under different portions or subroutines of the control system logic rules (i.e. the software).

A more detailed schematic illustration of the torque converter 20 and torque converter lock-up and disconnect clutch assembly 10 drivingly interposed engine 16 and automatic change gear transmission 14 may be seen by reference to FIG. 1. The torque converter assembly 20 is conventional in that it includes a fluid coupling of the torque converter type having an impeller 54 driven by the engine output or crank shaft 56 through a shroud 58, a turbine 60 hydraulically driven by the impeller and a stator or runner 62 which becomes grounded to a housing 64 via a one-way roller clutch 66 carried by a shaft 68 grounded to the housing 64. Shroud 58 also drives a pump 70 for pressurizing the torque converter, lubricating the transmission, selectively pressuring the transmission shifting mechanism 28 and/or power synchronizing mechanism 30 and/or operating the disconnect and bypass clutches 24 and 26. Pump 70 may be of any known structure such as, for example, a well known crescent gear pump.

The transmission 14 includes an input shaft 72 driven by the engine 16 via the torque converter assembly 20 and/or lock-up and disconnect clutch assembly 10. Transmission input shaft 72 carries a connecting member 74 fixed thereto for rotation therewith. Connecting member 74 includes a portion 76 associated with the torque converter disconnect clutch 24 and a second hub portion 78 splined for association with the input shaft. Briefly, as will be described in greater detail below, torque converter disconnect clutch 24 may be engaged or disengaged, independently of engagement or disengagement of lock-up clutch 26, to frictionally engage or disengage a connecting member 79 which is associated with the torque converter turbine 60 and a member of the lock-up clutch 26, to and from the transmission input shaft 72 via portion 76 of connecting member 74. Torque converter lock-up clutch 26 may be frictionally engaged or disengaged, independent of the engagement or disengagement of disconnect clutch 24, to frictionally engage the engine crankshaft 56, and shroud 58 driven thereby, to the connecting member 79.

Engagement of torque converter lock-up clutch 26 will engage the engine crankshaft 56, via shroud 58, directly with the connecting member 79, regardless of the engaged or disengaged condition of torque converter disconnect clutch 24, and thus provides an effective lock-up for locking-up the torque converter 20 and driving transmission 14 directly from the engine 16 if disconnect clutch 24 is engaged. Additionally, at speeds above torque converter lock-up speed, the lock-up clutch 26 need not be engaged and disengaged during shifting as disengagement of clutch 24 disconnects the inertia of connection member 79 from input shaft 72.

If the torque converter bypass clutch or lock-up 26 is disconnected, and the torque converter disconnect clutch 24 is engaged, the transmission 14 will be driven from engine 16 via the torque converter fluid coupling as is well known in the prior art. If the torque converter disconnect clutch 24 is disengaged, regardless of the condition of lock-up clutch 26, the transmission input shaft 72 is drivingly disengaged from any drive torque supplied by the engine or any inertial drag supplied by the torque converter, the engine and clutch 26. Disconnecting of the transmission input shaft 72 from the inertial affects of the engine, clutch 26 and/or torque converter allows the rotational speed of the input shaft 72, and all transmission gearing drivingly connected thereto, to be accelerated or decelerated by the transmission power synchronizer mechanism 30 in a more rapid manner for purposes of more rapidly achieving synchronization during a downshift or upshift of the transmission and also allows the power synchronizer 30 to cause the input shaft 72 to rotate at a rotational speed greater than any governed engine speed.

When the vehicle is at rest with the mode selector in the drive or off-highway drive mode, the disconnect clutch 24 will be engaged and the lock-up clutch 26 disengaged allowing for torque converter start-up with its well known advantages. At above a given vehicle speed and/or gear ratio, the advantages of torque converter operation are no longer required, and the increased efficiency of a direct drive between the drive engine and transmission is required. Upon these conditions, the torque converter lock-up clutch 26 will be maintained engaged allowing the transmission input shaft 72 to be driven directly from the engine via the torque converter shroud 58 and connecting member 79 when the disconnect clutch 24 is engaged.

As discussed above, clutch 24 will be disengaged to shift from a previously engaged gear to neutral, to allow the power synchronizer 30 to synchronize the jaw clutch members of the gear to be engaged and to allow engagement of the synchronized jaw clutches of the gear to be engaged.

Selection of the desired gear ratio and selection of the required engaged or disengaged condition of the torque converter disconnect or lock-up clutches, as well as the issuance of command signals to the various clutch and transmission operators is accomplished by the central processing unit 50 in a manner which is known in the prior art and which may be appreciated in greater detail by reference to above-mentioned U.S. Pat. Nos. 4,361,060 and 4,595,986.

The compound transmission 14 is illustrated in in greater detail in FIG. 3 and is of the type wherein the main section countershaft or countershafts 90 are coaxially aligned with the auxiliary section countershaft or countershafts 92. Transmission 14 is of a relatively standard design and is preferably of the twin countershaft type only one of which countershafts in the main and auxiliary sections, 94 and 96, respectively, is shown. Examples of such transmissions having coaxially aligned main section and auxiliary section countershafts may be seen by reference to U.S. Pat. Nos. 3,105,395 and 3,138,965, the disclosures of which are incorporated by reference.

Transmission 14 includes input shaft 72 to which member 78 is fixed for rotation therewith and which additionally carries input gear 98 nonrotatably attached thereto. Main section countershaft 90 is substantially parallel to mainshaft 100 and is provided with countershaft gears 102, 104, 106, 108, 110 and 112 fixed for rotation therewith. A plurality of mainshaft gears, also called ratio gears, 114, 116, 118 and 120, surround the mainshaft and are selectively clutchable thereto, one at a time, by double sided positive jaw clutch collars 122, 124 and 126. Jaw clutch collar 122 may also clutch the input shaft 72 directly to the mainshaft 100 while clutch collar 126 may clutch reverse mainshaft gear 128 to the mainshaft.

The mainshaft gears 114, 116, 118 and 120 circle the mainshaft and are in continuous meshing engagement with, and are preferably supported by, opposed pairs of countershaft gears 104, 106, 108 and 110 which mounting means and the special advantages resulting therefrom are explained in greater detail in above-mentioned U.S. Pat. Nos. 3,105,395 and 3,335,616. Reverse mainshaft gear 128 is in continuous meshing engagement with countershaft gear 112 by means of conventional intermediate idler gears (not shown). The forwardmost countershaft gear 102 is continuously meshed with and driven by input gear 98 for causing rotation of countershaft 90 whenever the input gear is rotatably driven.

Clutch collar 122 carries positive jaw clutch teeth 98$b$ and 114$b$ which are engageable with clutch teeth 98$a$ and 114$a$, respectively, to define positive jaw clutches 98$c$ and 114$c$, respectively. Clutch collar 124 carries positive jaw clutch teeth 116$b$ and 118$b$ which are engageable with jaw clutch teeth 116$a$ and 118$a$, respectively, to define positive jaw clutches 116$c$ and 118$c$, respectively. Jaw clutch collar 126 carries jaw clutch teeth 120$b$ and 128$b$ which are positively engageable with jaw clutch teeth 120$a$ and 128$a$, respectively, to define positive jaw clutches 120$c$ and 128$c$, respectively.

As is known in the prior art, each of the clutch collars are preferably directly or indirectly splined to the mainshaft for rotation therewith and axial movement relative thereto. Other mounting means for the clutch collars are known in the prior art and are intended to be included within the scope of the present invention. Each of the clutch collars 122, 124, and 126 is provided with means for receiving a shift fork or shift yoke 130, 132 and 134, respectively, whereby the clutch collars are axially moved, one at a time only, from the positions illustrated in FIG. 3 by the actuator 28.

The auxiliary transmission section 96 includes output shaft 22 which is preferably coaxial with input shaft 72 and mainshaft 100 and is supported for rotation in a transmission housing by means of bearings. The auxiliary section also includes an auxiliary section countershaft 92 supported for rotation in the housing by means of bearings. Fixed for rotation with mainshaft 100 is the auxiliary section drive gear 136. Auxiliary section countershaft 92 carries auxiliary section countershaft gears 138 and 140 fixed for rotation therewith. Auxiliary section countershaft gear 138 is constantly meshed with auxiliary section input gear 136 while auxiliary section countershaft gear 140 is constantly meshed with output gear 142 which surrounds the output shaft 22. A synchronized clutch structure 144, of conventional individually synchronized jaw clutch design, is utilized to selectively clutch mainshaft 100 and auxiliary drive gear 136 directly to the output shaft 22 for a direct drive connection between the mainshaft and output shaft or to clutch output gear 142 to the output shaft 22 for a reduction drive of output shaft 22 from mainshaft 100 through countershaft 92 as is well known in the prior art. Synchronized clutch structure 144 is controlled by shift fork 146 axially moved by actuator 28.

Transmission 14 is of the range type wherein the auxiliary section ratio step (or steps) is greater than the total ratio coverage of the main section ratios appearing in all ranges. Such transmissions are well known in the prior art, see U.S. Pat. No. 4,754,665, the disclosure of which is hereby incorporated by reference.

The power synchronizer assembly 30 includes a planetary speed increasing gear set driven by the output shaft 22 independently of the rotational speed of the drive engine 16, and selectively actuatable to accelerate the rotational speed of transmission elements driven by the input shaft 72 for purposes of synchronous rotation of jaw clutch members associated with the gear ratio to be engaged. Preferably, the power synchronizer assembly 30 will also include means to decelerate the transmission elements driven by the input shaft. Deceleration of the transmission elements driven by the input shaft may also be achieved by input shaft and/or engine braking devices which will preferably be controlled by central processing unit 50.

The power synchronizer assembly 30 is driven by the vehicle through gear 142 which is driven directly or indirectly by output shaft 22 and thus the power synchronizer is not effective to accelerate the mainsection countershaft 90 when the auxiliary section is not engaged.

Details of construction and operation of the power synchronizer assembly 30 may be appreciated in greater detail by reference to above-mentioned U.S. Pat. No. 4,614,126.

Figure 4:
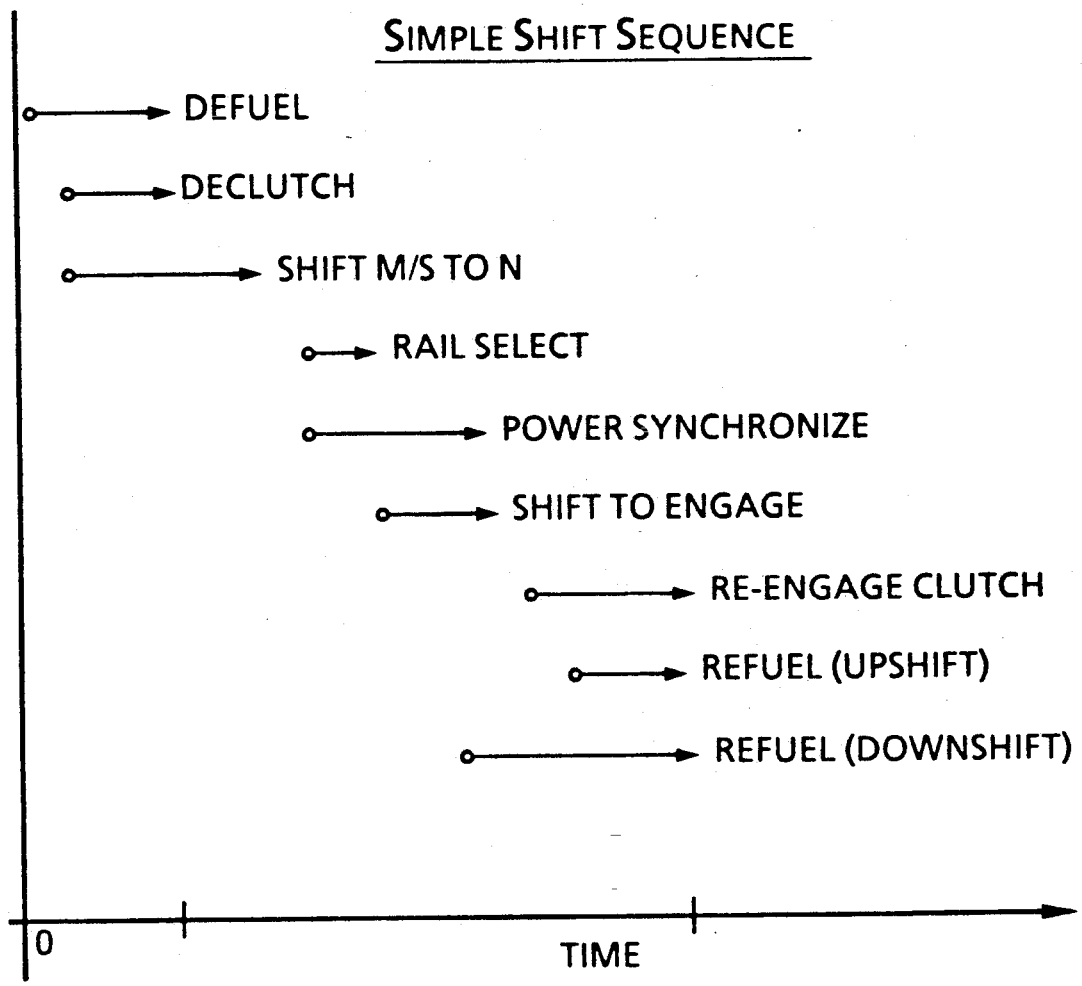
FIG. 4 is a graphical representation of a typical shift sequence for the transmission of FIG. 2.
Figure 5:
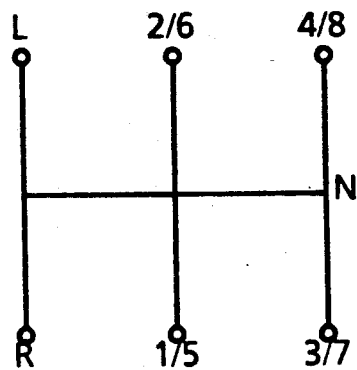
FIG. 5 is a symbolic representation of the shift pattern for the transmission of FIG. 3.

The shift sequence for a simple shift of transmission 14 in system 12 is illustrated in FIG. 4. Assuming the ECU 50 determines that a shift from second (2nd) to third (3rd) speed is required (i.e. a simple upshift), the ECU will cause fuel controller 34 to defuel (i.e. "dip") the engine regardless of the position of the throttle pedal 32. While the engine is being defueled, the disconnect clutch (or master clutch) 24 is disengaged and shift to mainsection 94 neutral is undertaken.

Upon defueling the engine, declutching the disconnect clutch and disengaging the mainsection, the power synchronizer is actuated to cause the mainshaft gearing (in this example 3rd speed mainshaft gear 114) to rotate at a target or substantially synchronous speed relative to mainshaft 100 as determined by output shaft speed and auxiliary section 96 ratio. Output shaft speed is sensed by sensor 44 while the speed of the various mainshaft gears is a known multiple of input shaft 72 speed as sensed by sensor 42.

The rail select function can occur at any time after mainsection disengagement and mainsection reengagement in the new ratio is timed to occur as the power synchronizer is bringing the engaged gear towards target speed. Of course, for an upshift the power synchronizer is normally required to retard the speed of the input shaft and associated gearing.

Upon achieving engagement of the proper mainsection ratio, the disconnect clutch is reengaged and the engine refueled.

Typically, a simple shift can be accomplished in about 0.70 to 0.80 seconds with a disconnect (i.e. torque break) time of about 0.50 seconds.

To prevent the engine from accelerating to an undesirably and/or damagingly high speed upon declutching, and to allow the engine speed to decay during an upshift for smoother reengagement of the master clutch or torque converter disconnect clutch, it is important to determine that the throttle dip override device 34 is properly working or, if a fault is sensed, to provide an appropriate fault tolerant mode of operation.

Figure 6:
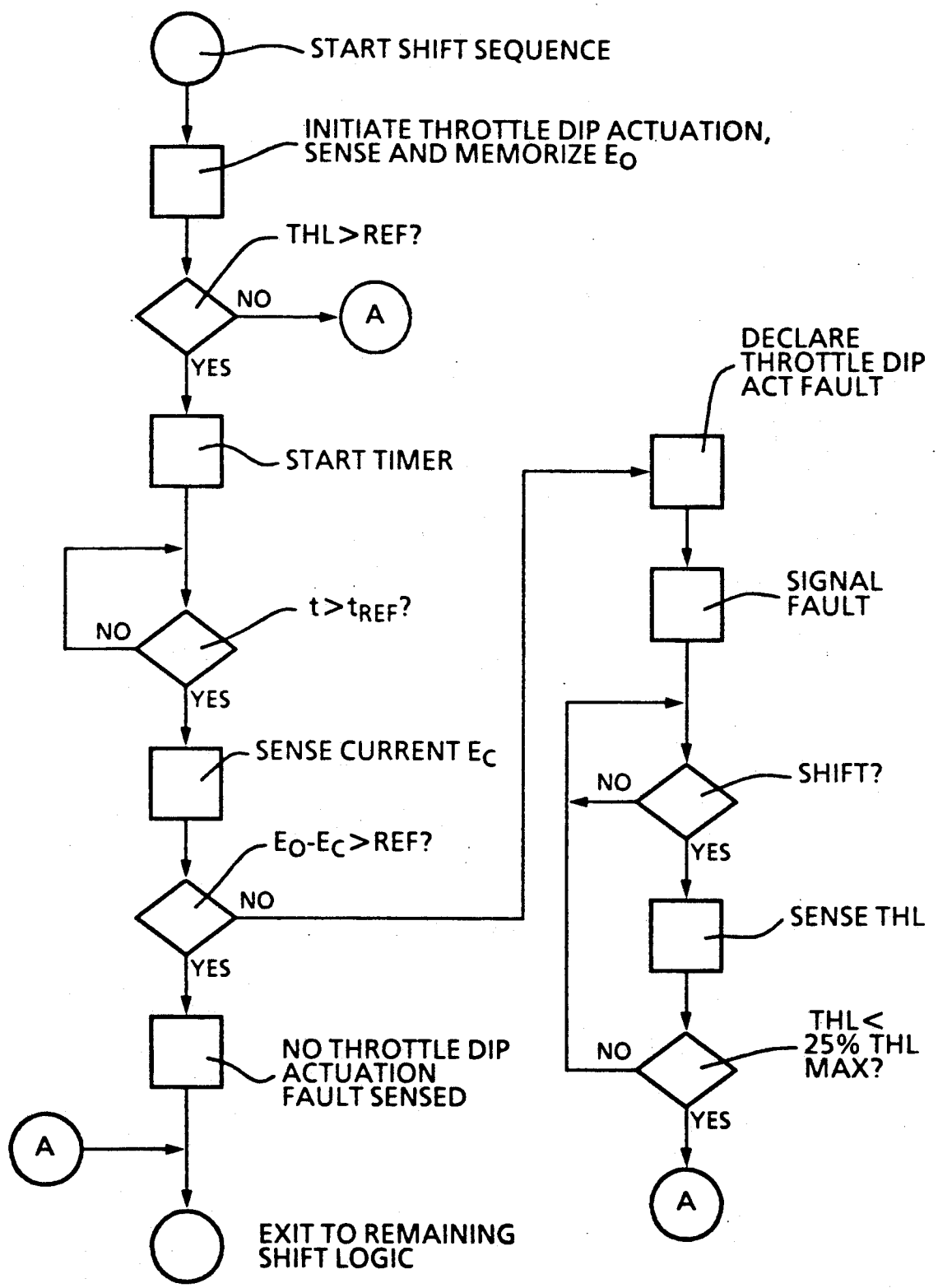
FIG. 6 is a symbolic representation, in flow chart format, of the fault sensing and tolerance logic of the present invention.

Accordingly to the control system/method of the present invention, see FIG. 6, just prior to or at the time of commanding actuation of throttle dip override device 34, an initial engine speed ($E_o$) is sensed and memorized. It is then determined if throttle pedal position (THL) is greater than a reference throttle position equal to about 25% to 30% of maximum throttle pedal position. If throttle pedal position does not exceed the reference, then a test for a failure of throttle dip override device actuation is not conducted.

If the fault test is conducted, a timer is set to time a period of time ($T_{REF}$) equal to about 800 milliseconds at which time a current engine speed ($E_c$) is sensed and compared to the initial value ($E_o$) to determine if engine speed has decayed as would be expected if the throttle dip device is properly operating.

If the engine speed does decay as expected, then the shift sequence proceeds accordingly. If an engine speed decay does not occur, then a throttle dip actuation fault is declared and the operator may be notified via a fault display. If a shift is required, the shift sequence will not proceed until the operator manually decreases throttle pedal position and thus engine fueling, to below a reference value which is preferably about 25% to 30% of the full throttle position.

Accordingly, it may be seen that a shift control system and method for an automated mechanical transmission system having a throttle dip override device for automatic fuel control is provided having throttle dip override device actuator fault sensing and fault tolerant logic.

It is understood that the above description of the preferred embodiment is by way of example only and that various modifications, substitutions and/or rearrangements of the parts are possible without departing from the spirit and the scope of the present invention as hereinafter claimed.

I claim:

1. A method for controlling shifting an automated mechanical transmission system (12) of the type comprising a mechanical transmission (14), a fuel controlled engine (16), a nonpositive coupling (10) drivingly interposed the engine and the transmission, an operator set throttle control device (32), a throttle override device (34) effective to limit the maximum amount of the fuel supplied to the engine to a predetermined amount regardless of the setting of the throttle control device, and a central control unit (50) effective to receive input signals indicative of the status of the transmission system including signals indicative of (i) engine speed, and to process same in accordance with logic rules to issue command output signals to a plurality of system actuators, said method characterized by:

sensing for a required shift of said transmission;
responding to sensing a required shift of said transmission by initiating actuation of said throttle override device and sensing and memorizing the initial value of engine speed ($ES_o$) at the time of initiating actuation of said throttle override device;

allowing a period of time ($T_{REF}$) to pass and then sensing the then current engine speed ($ES_c$); and comparing the initial value of engine speed to the current value of engine speed and determining a throttle override device actuation fault if said initial value does not exceed said current value by at least a reference value ($ES_o - ES_c \geq REF$).

2. The control method of claim 1 wherein said reference value (REF) equals zero.

3. The control method of claim 1 wherein said reference value (REF) is greater than zero.

4. The control method of claims 1, 2 or 3 wherein said input signals also include signals indicative (ii) of the operator's setting of the throttle device, said sensing and comparing of engine speeds to determine a throttle override device actuation fault only proceeding if said sensed throttle setting (THL) exceeds a first throttle position reference ($THL_{REF-1}$).

5. The control method of claims 1, 2 or 3 wherein said input signals also include signal indicative (ii) of the operator's setting of the throttle device and further comprising, if a throttle override device actuation fault is determined, preventing transmission upshifts if sensed throttle position (THL) exceeds a second throttle reference value ($THL_{REF-2}$).

6. The control method of claim 4 wherein said input signals also include signal indicative (ii) of the operator's setting of the throttle device and further comprising, if a throttle override device actuation fault is determined, preventing transmission shifts if sensed throttle position (THL) exceeds a second throttle reference value ($THL_{REF-2}$).

7. The method of claim 4 wherein said first throttle reference value ($THL_{REF-1}$) equals about 20%-30% of full throttle setting.

8. The method of claim 5 wherein said second throttle reference value ($THL_{REF-2}$) equals about 20% to 30% of full throttle.

9. The method of claim 6 wherein said first throttle reference value ($THL_{REF-1}$) equals about 20%-30% of full throttle setting.

10. The method of claim 9 wherein said second throttle reference value ($THL_{REF-2}$) equals about 20% to 30% of full throttle.

11. The method of claims 1, 2 or 3 wherein said transmission system (14) further includes a power synchronizer assembly (30).

12. The method of claims 1, 2 or 3 wherein said predetermined amount of fuel is about the amount of fuel required to maintain said engine at about an idle speed setting thereof.

13. The method of claims 1, 2 or 3 additionally comprising notifying the operator of a fault upon determining the existence of a throttle override device actuation fault.

14. The method of claims 1, 2 or 3 wherein said period of time is in the range of 500 to 1000 milliseconds.

15. A control system for controlling shifting in an automated mechanical transmission system (12) of the type comprising a mechanical transmission (14), a fuel controlled engine (16), a nonpositive coupling (10) drivingly interposed the engine and the transmission, an operator set throttle control device (32), a throttle override device (34) effective to limit the maximum amount of the fuel supplied to the engine to a predetermined amount regardless of the setting of the throttle control device, and a central control unit (50) effective to receive input signals indicative of the status of the transmission system including signals indicative of (i) engine speed, and to process same in accordance with logic rules to issue command output signals to a plurality of system actuators, said system characterized by said logic rules including rules:

for sensing for a required shift of said transmission;

for responding to sensing a required shift of said transmission for by (i) initiating actuation of said throttle override device and (ii) sensing and memorizing the initial value of engine speed ($ES_o$) at the time of initiating actuation of said throttle override device;

for allowing a period of time ($T_{REF}$) to pass and then sensing the then current engine speed ($ES_c$); and for (i) comparing the initial value of engine speed to the current value of engine speed and (ii) determining a throttle override device actuation fault if said initial value does not exceed said current value by at least a reference value ($ES_o - ES_c \geq REF$).

16. The control system of claim 15 wherein said reference value (REF) equals zero.

17. The control system of claim 15 wherein said reference value (REF) is greater than zero.

18. The control system of claims 15, 16 or 17 wherein said input signals also include signals indicative (ii) of the operator's setting of the throttle device, said sensing and comparing of engine speeds to determine a throttle override device actuation fault only proceeding if said sensed throttle setting (THL) exceeds a first throttle position reference ($THL_{REF-1}$).

19. The control system of claims 15, 16 or 17 wherein said input signals also include signal indicative (ii) of the operator's setting of the throttle device and further comprising, if a throttle override device actuation fault is determined, preventing transmission upshifts if sensed throttle position (THL) exceeds a second throttle reference value ($THL_{REF-2}$).

20. The control system of claim 18 wherein said input signals also include signal indicative (ii) of the operator's setting of the throttle device and further comprising, if a throttle override device actuation fault is determined, preventing transmission shifts if sensed throttle position (THL) exceeds a second throttle reference value ($THL_{REF-2}$).

21. The control system of claim 18 wherein said first throttle reference value ($THL_{REF-1}$) equals about 20%-30% of full throttle setting.

22. The control system of claim 19 wherein said second throttle reference value ($THL_{REF-2}$) equals about 20% to 30% of full throttle.

23. The control system of claims 15, 16 or 17 wherein said predetermined amount of fuel is about the amount of fuel required to maintain said engine at an idle speed setting thereof.

24. The control system of claims 15, 16 or 17 additionally comprising rules for notifying the operator of a fault upon determining the existence of a throttle override device actuation fault.

25. The control system of claims 15, 16 or 17 wherein said period of time is in the range of 500 to 1000 milliseconds.

* * * * *